United States Patent [19]

Martin

[11] 3,711,992
[45] Jan. 23, 1973

[54] APPARATUS FOR NURTURING TREES

[76] Inventor: Marcel N. Martin, 1085 Richard Ave., Ottawa 8, Ontario, Canada

[22] Filed: March 18, 1971

[21] Appl. No.: 125,590

[52] U.S. Cl. .................................47/48.5, 47/37
[51] Int. Cl. ..................................A01g 29/00
[58] Field of Search ..........................47/1, 37, 48.5

[56] References Cited

UNITED STATES PATENTS

| | | | |
|---|---|---|---|
| 291,947 | 1/1884 | Skillen | 47/48.5 |
| 584,886 | 6/1897 | Mead | 47/48.5 X |
| 3,109,258 | 11/1963 | Jensen | 47/48.5 |

*Primary Examiner*—Robert E. Bagwill
*Attorney*—Peter Kirby, Charles P. Curphey and Norris M. Eades

[57] ABSTRACT

Newly planted, transplanted and ailing trees require a continuous supply of water to the root area below ground level, access to air at ground level immediately above the root area, protection from the drying effects of excessive sunshine, stabilization of their trunks from the effects of high winds and maintenance of their trunks vertical. The apparatus described for this purpose includes a water tank shaped for placing on the ground substantially surrounding the lower trunk portion of the tree while defining a space around such portion. The tank is preferably formed of two like halves which, when joined together surrounding the lower trunk portion of the tree, define the space around it. The tank has an inner peripheral area located directly above the root area, an outer peripheral area located remote from the root area, and an intermediate area between the inner and outer peripheral areas. Surface means are located at the inner peripheral area for distributing at least a portion of the weight of the tank and water therein to the ground directly above the root area to exert a stabilizing effect thereon while not significantly penetrating the ground. Means are located around the outer peripheral area for supporting the same on the ground remote from the root area, including means for adjusting the level of the tank. The surface and supporting means locate at least a part of the intermediate area of the tank spaced above the ground to define air spaces over a substantial portion of the ground above the root area. Conduit means are provided for connecting the interior of the tank to the root area.

6 Claims, 5 Drawing Figures

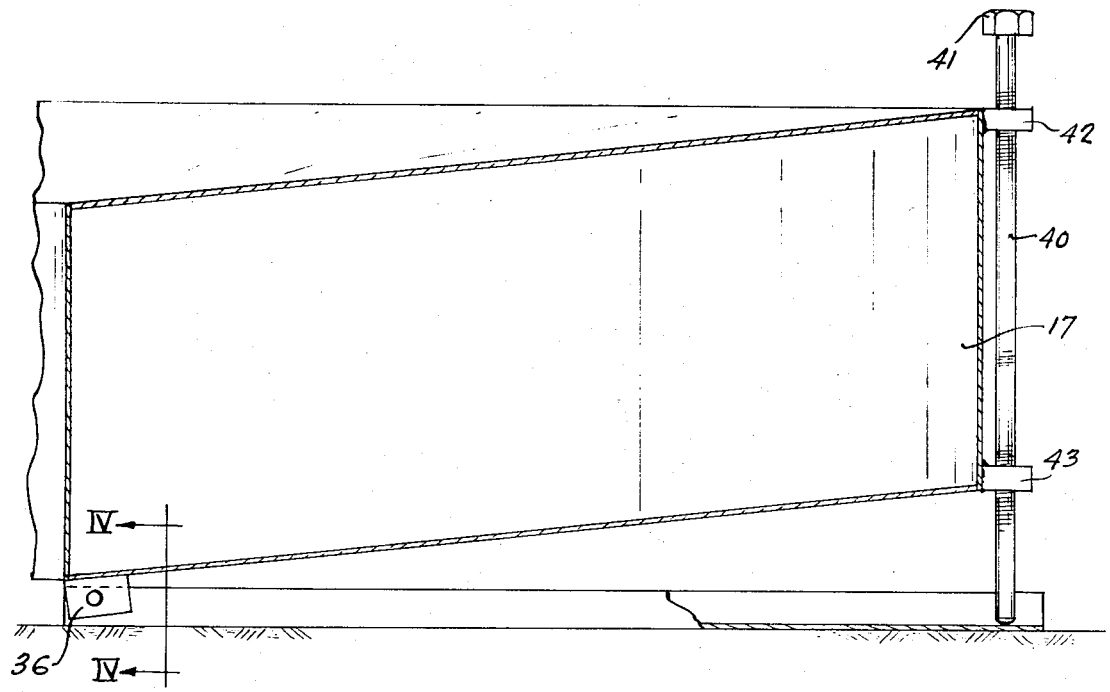
Fig.3.
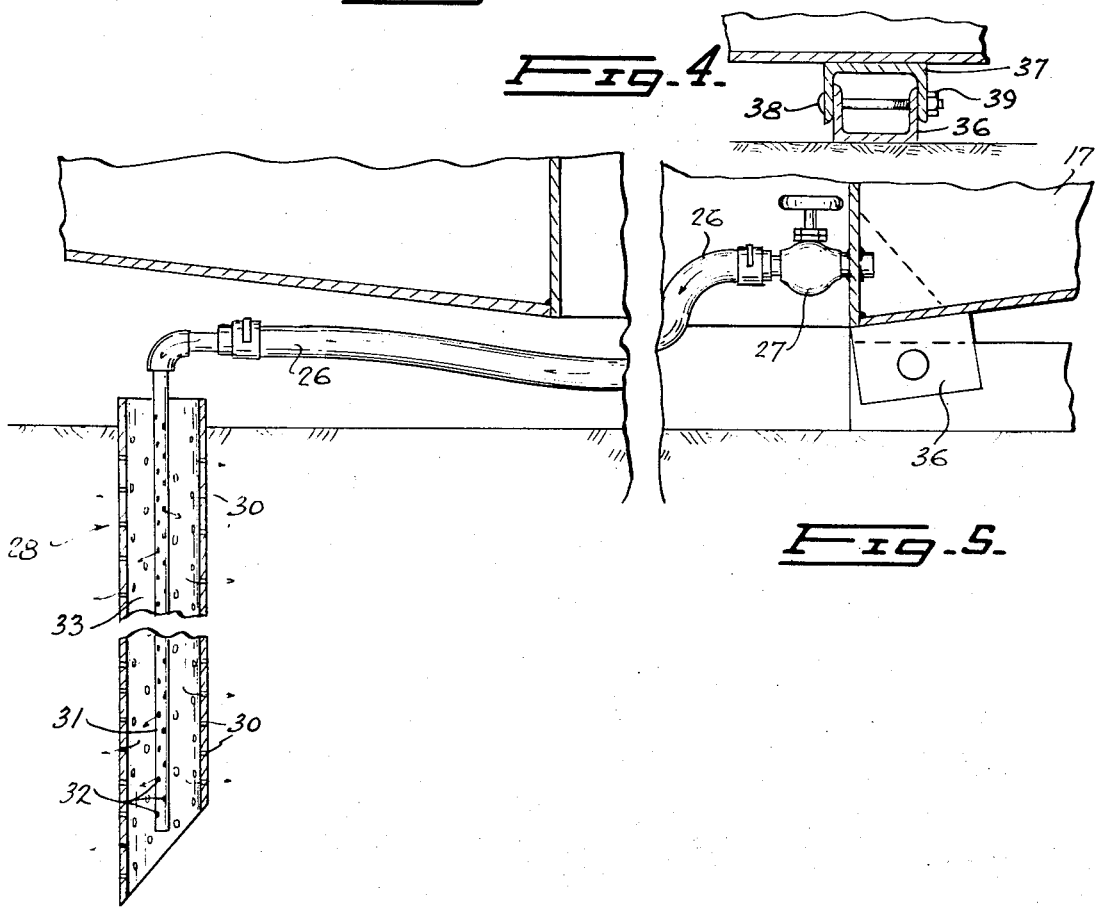
Fig.4.
Fig.5.

APPARATUS FOR NURTURING TREES

This invention relates to an apparatus for nurturing newly planted, transplanted and ailing trees.

For healthy early growth, the root area below ground level of newly planted trees, requires a continuous supply of water, access to air at ground level immediately above the root area and protection from the drying effects of excessive sunshine.

Some trees planted by landscapers have reasonably thick trunks, sometimes as much as 6 inches in diameter. The root ball of such a tree can be 5 to 6 feet in diameter. Therefore a significant volume of soil has to be supplied with water and a considerable area of ground has to be protected from the sun. Stabilization of the tree trunks from the effects of high winds and maintenance of the tree trunks vertical, which are usually done by the use of guy wires leading from the ground to the upper trunk portion, are other requirements to be met.

Prior to my invention, it was known to locate a tank of water on the ground near a tree to be planted and to feed water to the vicinity of its roots by means of underground pipes leading from the tank. Such an arrangement is disclosed in Canadian Pat. 297,381 which issued on Feb. 4 1930 to Paul H. Davey.

However, this type of device suffered from a number of shortcomings. It is usual to add no more than 2 inches of topsoil above ground level above the root ball. It was thus necessary to locate the prior art tank several feet from the tree root area on solid ground to prevent the weight of the tank on the topsoil from killing the roots immediately below the topsoil. This problem has been compounded in recent years, since many trees are planted on sloping terrain, thereby making it very difficult to find a suitable location for the tank and to level it. Because of its complex network of underground pipes, the patented device was also incapable of being used to treat an ailing tree that was already planted.

I have invented an apparatus for nurturing planted trees that: (a) provides for controlled feeding of water to the tree root area; (b) allows air to get to the tree root area, while protecting this area from becoming dried out by excessive exposure to the sun; (c) stabilizes the tree trunk from the effects of high winds; and (d) permits improved vertical orientation of the tree trunks.

According to my invention, there is provided a water tank shaped for placing on the ground substantially surrounding the lower trunk portion of the tree while defining a space around such portion. The tank has an inner peripheral area located directly above the root area, an outer peripheral area located remote from the root area, and an intermediate area between the inner and outer peripheral areas. Surface means are located at the inner peripheral area for distributing at least a portion of the weight of the tank and water therein to the ground directly above the root area to exert a stabilizing effect thereon while not significantly penetrating the ground. Means are located around the outer peripheral area for supporting the same on the ground remote from the root area, including means for adjusting the level of the tank. The surface and supporting means locate at least a part of the intermediate area of the tank spaced above the ground to define air spaces over a substantial portion of the ground above the root area. Conduit means are provided for connecting the interior of the tank to the root area.

By the term "root area," I mean the space below ground level occupied by the root ball (if one is used) or the roots themselves (if a root ball is not used), and by the earth that fills the evacuation hole made when a tree is planted. By the term "located directly above the root area," I mean over the root ball or the roots themselves, as the case may be. The tank is preferably formed of two like halves which, when joined together surrounding the lower trunk portion of the tree, define the space around such portion.

The surface means preferably comprise a plurality of spaced-apart elongated plates for attachment at one end to the bottom of the tank at the inner peripheral area thereof, the plates extending along the ground with the other end thereof being located beyond the outer peripheral area of the tank. The support means comprise a plurality of spaced apart vertically extending rods attached around the outer peripheral area of the tank with the bottom of each rod seated on the other end of an associated plate below the bottom of the tank. The adjusting means comprises means for raising and lowering each rod with respect to the outer peripheral area of the tank thereby to raise and lower the tank with respect to the ground.

An embodiment of the invention will now be described, by way of example, with reference to the accompanying drawings, in which:

FIG. 3 is a greatly enlarged view showing details of the trunk stabilizing and tank levelling means of my apparatus;

FIG. 4 is a section taken along line IV—IV of FIG. 3; and

FIG. 5 is a greatly enlarged view of a portion of FIG. 1 showing the conduit connection from the tank to the tree root area.

Figure 1:
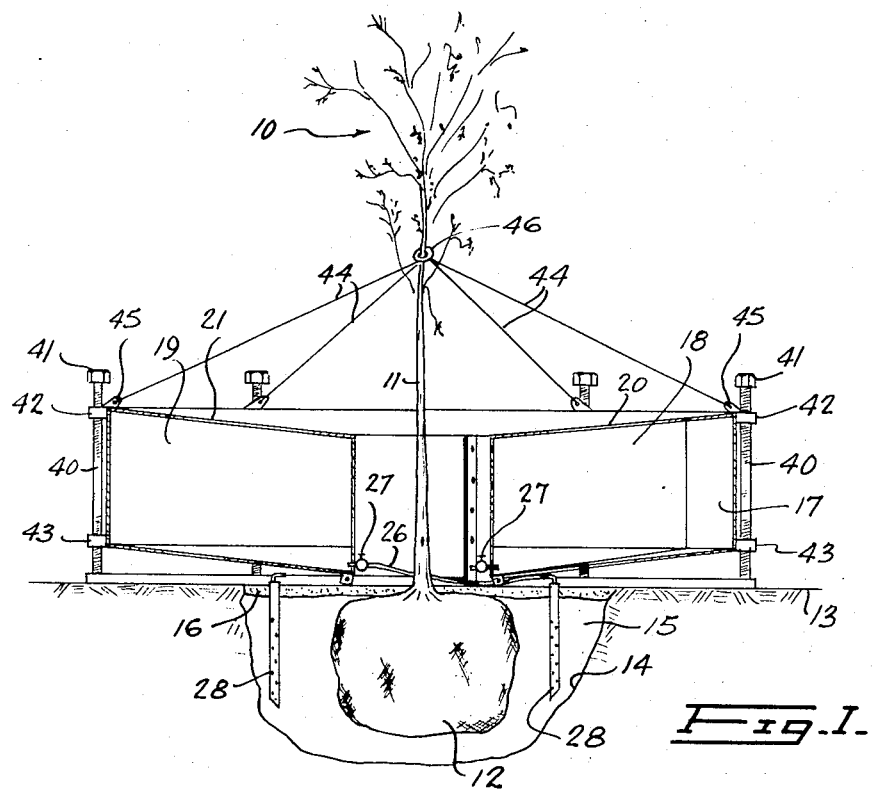
FIG. 1 is a sectioned, front elevation view of the apparatus installed around a young tree.
Figure 2:
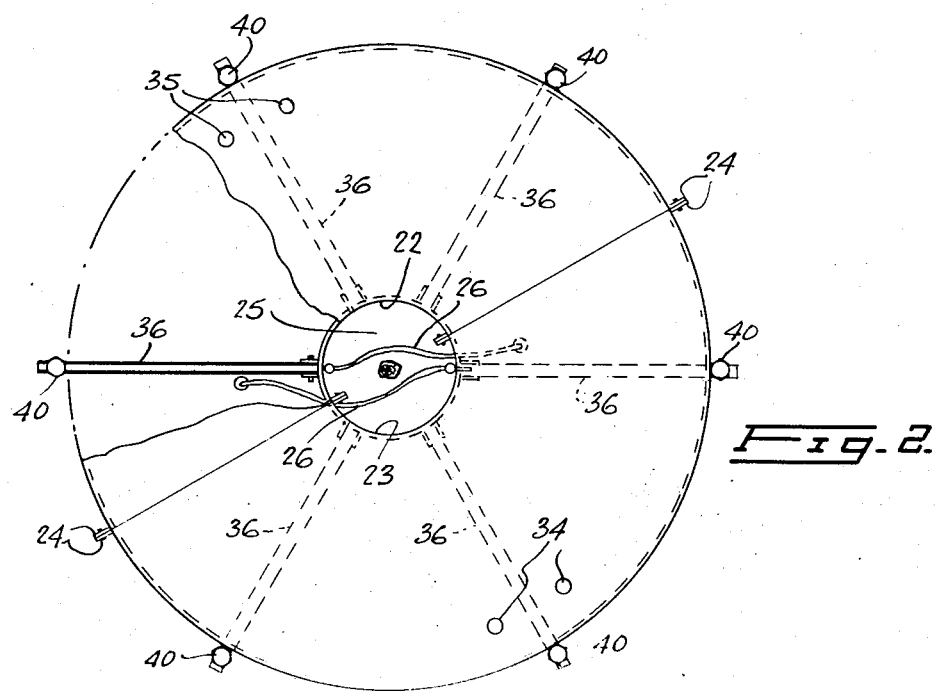
FIG. 2 is a plan view of FIG. 1 partly broken away for clarity.

Referring to the drawings, a tree 10 having a trunk 11 and a root ball 12 is shown planted beneath ground level 13 in an excavation hole 14. The hole 14 is then filled with loose earth 15 to ground level and about 2 inches of topsoil 16 is placed over the earth 15 above the root ball about the tree trunk 11. The root area thus includes the space below ground level defined by the root ball 12 and the filled hole 14.

A tank 17 is placed around the tree trunk 11. The tank 17 is composed of two like halves 18 and 19, each being in the shape of a cylindrical semi-annulus, but having downwardly and sloping tops 20 and 21 and semi-cylindrical grooves 22 and 23 on their inner surfaces. The two halves 18 and 19 are joined together at flanges 24 that extend completely along their vertical edges, the halves defining a cylindrical space 25 extending up from the ground immediately surrounding the lower portion of the trunk 11.

As best seen in FIG. 5 conduit means are shown as conduits 26 extending from the bottom interior of each tank-half via taps 27 to a location adjacent the root ball 12, and vertically extending conduits 28 connected to conduits 26 and extending underground into the soil.

The conduits 28 are preferably formed of 4 inch outer tubing 29, perforated with holes 30, and having a one-half inner tubing 31, also perforated with holes 32, extending down the interior of the outer tubing 29. The spaces between the inner and outer tubings 29 and 31 are filled with small stones 33. Filler openings 34 and vent pipes 35 are provided on the top of the tank to equalize pressure.

A plurality of elongated plates 36 in the form of shallow U-shaped channel irons are fixed at spaced-apart locations to the bottom of the tank 17 at its inner peripheral area. As shown in FIG. 4, inverted U-shaped short pieces of channel iron 37 are welded to the bottom of the tank 17 and are attached to the ends of the plates 36 by bolts 38 and nuts 39. The plates 36 extend along the ground past the outer peripheral area of the tank 17 beyond the excavation hole 14. The plates 36 are typically 4 inches wide and 1 ½ inches high. A plurality of vertically extending threaded rods 40 having hexagonal heads 41 are each attached around the outer peripheral area of the tank 17 at spaced apart locations by means of threaded nuts 42 welded near the top of the tank 17 and threaded nuts 43 welded near the bottom of the tank 17. The bottoms of the rods 40 are rounded, as best seen in FIG. 3, and are arranged to seat in the outer extension of plates 36. In the embodiment shown, six plates 36 and six rods 40 are provided.

A plurality of guy wires 44 are connected from eyelets 45 welded to the top of the tank 17, to a rubber ring 46 encircling the upper portion of the tree trunk.

The installation and operation of my apparatus will now be described. The hole 14 is excavated; the tree 10 is plated; the hole 14 is filled with loose soil 15; and the layer of topsoil 16 added. The conduits 28 are then placed in the ground. The tank halves 18 and 19, with plates 36 and conduits 26 attached thereto, are placed while still empty, around the tree trunk and bolted together at flanges 24 to form the tank 17. Rods 40 are screwed downwardly by means of a wrench into the plates 36 to raise the bottom of the tank slightly off the ground. The conduits 26 are then connected between the taps 27 and the conduits 28. The rods 40 are individually adjusted to provide the required amount of levelling of the tank 17. It can be seen that the screwing of the rods 40 into the nuts 42 and 43 raises the outer peripheral area of the tank and causes water in the tank, after it has been filled, to flow toward its inner peripheral area. In addition, the tilting of the tank 17 defines air spaces over a substantial portion of the ground above the root area. The physical presence of the tank 17 over the root area protects the roots from excessive sunshine. The weight of the inner peripheral area of the tank 17 and water therein over the root ball 12 helps to stabilize the tree trunk. The guy wires 44 are provided for additional vertical levelling and trunk stabilization.

It is noted that the tops 20 and 21 of the tank-halves 18 and 19 are tilted downwardly and inwardly from the outer peripheral area to guide rain water to the base of the tree trunk for additional irrigation.

For a tree having a trunk diameter of up to 12 inches (although trunks greater than 6 inches are seldom encountered), the tank halves 18 and 19 can each be typically 20 inches high at their outer peripheral area, 19 inches high at their inner peripheral area and 2 ¼ feet wide, leaving the space surrounding the trunk as having a diameter of 1 ½ feet.

Many variations in detailed construction can be made to the apparatus without departing from the spirit of my invention. For example, instead of the rod 40 being designed for screw adjustment, it could be designed for linear adjustment similar to an automobile jack. The tank 17 could take many different shapes while still retaining its essential features. The plates 36 could take the form of flat sheets of metal, or separate plates or the like could be used as the surface means for distributing the weight of the tank to the ground directly above the root area, and as the means for supporting the outer peripheral area on the ground remote from the root area. Should the ground slope away sharply over part of the periphery of the tank, a longer rod 40 could be used, but in order to prevent such a rod from buckling and possibly breaking, some sort of strong framework could be readily employed at the outer peripheral area of the tank to provide additional structural support for the rod.

The tank could be formed of plastic material and could be shaped to have the functional equivalent of the assembly shown in FIG. 4 as an integral part thereof. This could take the form of a continuous thin ridge of material around the bottom of the inner peripheral area of the tank to distribute a portion of the weight of the tank and water therein to the ground directly above the root area. The bottom of the tank could slope upwardly over its intermediate area toward its peripheral area to provide the necessary air spaces over the ground above the root area.

The embodiments of the invention in which an exclusive property or privilege is claimed are defined as follows:

1. Apparatus for nurturing a planted tree having a root area below ground level, comprising:
   a. a water tank shaped for placing on the ground substantially surrounding the lower trunk portion of the tree while defining a space around such portion, with an inner peripheral area located directly above the root area, an outer peripheral area located remote from the root area, and an intermediate area between the inner and outer peripheral areas;
   b. surface means located at the inner peripheral area for distributing at least a portion of the weight of the tank and water therein to the ground directly above the root area to exert a stabilizing effect thereon while not significantly penetrating the ground;
   c. means located around the outer peripheral area for supporting the same on the ground remote from the root area, including means for adjusting the level of the tank;
   d. said means (b) and (c) locating at least a part of the intermediate area of the tank spaced above the ground to define air spaces over a substantial portion of the ground above the root area;
   e. and conduit means for connecting the interior of the tank to the root area.

2. Apparatus as defined in claim 1 wherein the surface means comprise a plurality of spaced-apart elongated plates for attachment at one end to the bottom of the tank at the inner peripheral area thereof, the plates extending along the ground with the other end thereof being located beyond the outer peripheral area of the tank; and wherein the support means comprise a plurality of spaced-apart vertically extending rods attached around the outer peripheral area with the bottom of each rod seated on the other end of an associated plate below the bottom of the tank, and the adjusting means comprises means for raising and lowering each rod with respect to the outer peripheral area of the tank thereby to raise and lower the tank with respect to the ground.

3. Apparatus as defined in claim 2 in which the tank is formed of two like halves which, when joined together surrounding the lower trunk portion of the tree, define said space around such portion.

4. Apparatus as defined in claim 2 including a plurality of guy wires for connection between the top of the tank at spaced apart locations around its outer peripheral area and the upper trunk portion of the tree.

5. Apparatus as defined in claim 1 in which the tank is formed of two like halves which, when joined together surrounding the lower trunk portion of the tree, define said space around such portion.

6. Apparatus as defined in claim 1 including a plurality of guy wires for connection between the top of the tank at spaced apart locations around its outer peripheral area and the upper trunk portion of the tree.

* * * * *